UNITED STATES PATENT OFFICE.

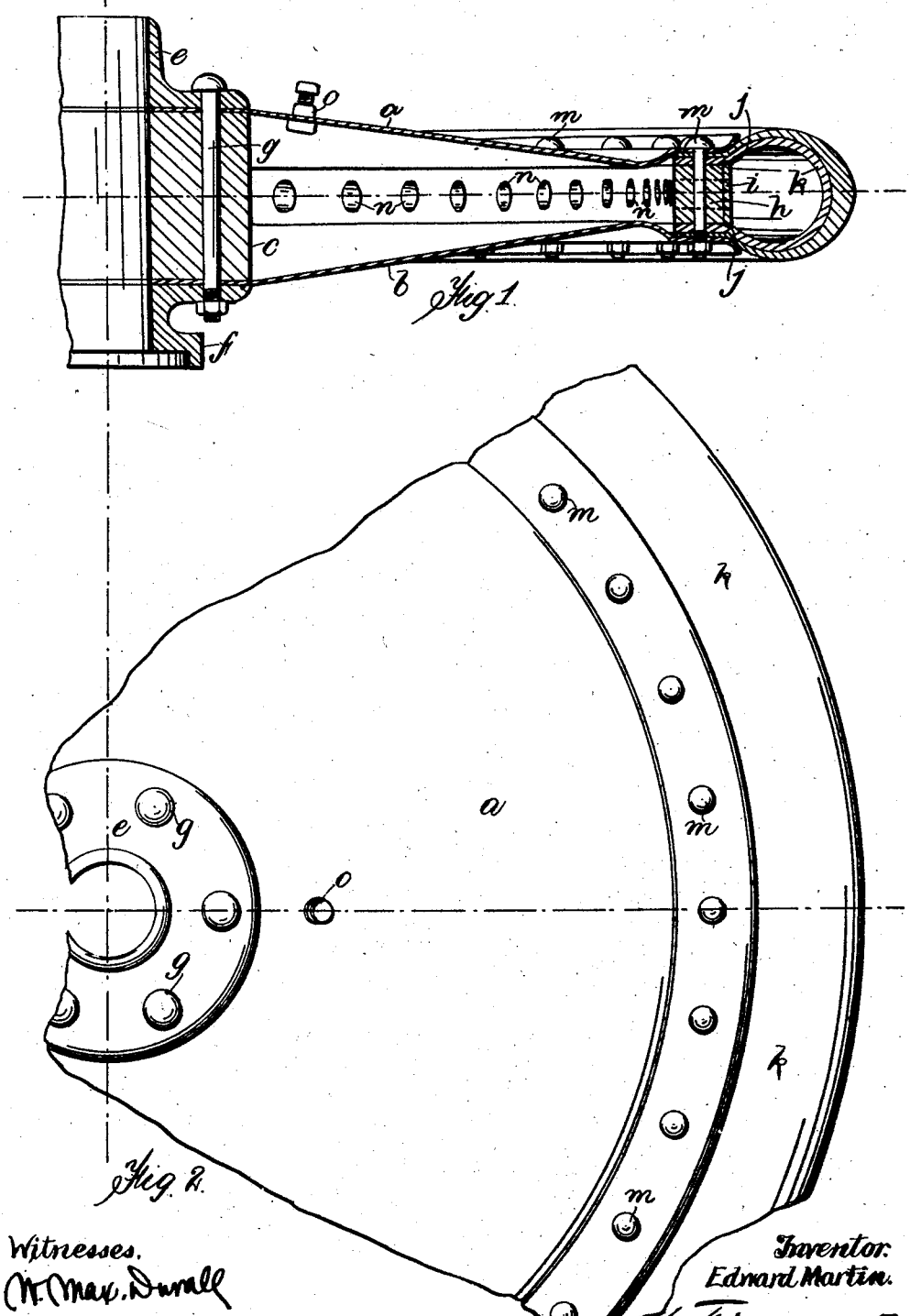

EDWARD MARTIN, OF BATTERSEA, ENGLAND.

DISK-WHEEL FOR ROAD-VEHICLES.

No. 842,102.  Specification of Letters Patent.  Patented Jan. 22, 1907.

Application filed May 7, 1906. Serial No. 315,660.

*To all whom it may concern:*

Be it known that I, EDWARD MARTIN, a subject of the King of England, residing at 61 Newland Terrace, Queen's Road, Battersea, in the county of London, England, have invented certain new and useful Improvements in Disk-Wheels for Road-Vehicles; and I do hereby declare the following to be a full, clear, and exact description of the invention, such as will enable others skilled in the art to which it appertains to make and use the same.

This invention refers to an improved diskwheel for road-vehicles, which wheel is especially applicable for use with a pneumatic tire, but which may be used with advantage for carrying a solid tire with a U-shaped cover.

It is well known that one of the reasons why pneumatic tires burst, especially when attached to motor-cars, is that the interior inflated chamber of the tire is so small compared with the pressure which it has to sustain that a sudden shock often puts too severe a strain upon the cover. It has been suggested from time to time to relieve this pressure by putting the inner chamber of the tire in connection with a flexible fluid-containing chamber, located, for instance, in the case of a disk-wheel between the disks; but extreme difficulty has been experienced in providing a suitable bag for containing the air and in making all the joints air-tight, and in order that my said invention may be better understood I will now proceed to describe the same with reference to the drawings accompanying this specification, in which—

Figure 1 is a section through the center of the wheel. Fig. 2 is a side elevation of a quarter of the wheel.

The same letters of reference are employed to denote the same parts in both the views.

*a b* are disks of steel or other suitable material, which are dished or shaped as shown at Fig. 1, for the reception of the various parts of the wheel and tire.

*c* is an intermediate portion made, preferably, of aluminium for the sake of lightness and provided with transverse holes.

*e* and *f* show portions of an ordinary artillery-hub.

*g* shows bolts for passing through holes in the disks *a b*, the intermediate portion *c*, and the hub portions *e* and *f* for holding the whole firmly together.

*h* is a circumferential ring which takes the place of a felly. This ring may be made of aluminium or other suitable material faced with an iron band *i*, provided with projecting edges or beadings *j*, or such projecting edges or beadings may be formed on the ring *h* itself, the band *i* being dispensed with.

*k* is a tire of U shape.

*m* represents bolts which pass through holes in the edges of the disks *a b*, through the edges of the tire *k*, and through the ring *h* for holding the whole in position.

*n* represents holes passing radially through the ring *h* in order to allow a free passage for the air from the interior of the chamber formed between the disks to the interior of the tire.

*o* is a valve of ordinary construction.

When desired, a solid tire may be substituted for the pneumatic tire *k*, in which case it is unnecessary to fill the chamber formed by the disks with air.

A pneumatic disk-wheel constructed as herein described is far more resilient than the ordinary tire, owing to the increased size of the air-chamber, while at the same time there is less liability to puncture and the life of the tire is increased. Moreover, there is less dust thrown up from the road, owing to the absence of the fan-like action produced by the spokes and the greatly-reduced size of the tread of the tire.

What I claim, and desire to secure by Letters Patent of the United States of America, is—

1. A disk-wheel, comprising a pair of side disks securely spaced apart centrally and converging outwardly, and an apertured spacing-ring disposed between said disks at their peripheral edges, said ring adapted to have a pneumatic tire secured thereto, with said apertures in communication with the interior of the tire, the whole constructed to form an air-tight chamber within said wheel, in communication with the interior of the pneumatic tire, substantially as described.

2. A pneumatic disk-wheel comprising two disks bolted together with an inner middle portion at the hub of the wheel and a circumferential ring portion provided with radial holes, in combination with a pneumatic tire, the cover of which is bolted between the edges of the disks and the circumferential ring portion so that the interior of the diskwheel and the interior of the pneumatic tire may form one air-tight chamber in connection with one another for the purposes set forth.

3. The combination with a disk-wheel, comprising two disks bolted together with an inner middle portion at the hub of the wheel and a circumferential ring portion of a tire provided with a U-shaped cover, such cover being bolted between the disks and the circumferential ring portion substantially as described.

4. In a disk-wheel, the combination with a pair of side disks disposed parallel centrally and provided with an internal spacing member, hub members, and means for securely holding same together, said disks converging outwardly from said central spacing member and terminating at their peripheral edges in an annular recess, a ring member disposed within said recess and provided with a plurality of radially-disposed apertures adapted to form communicating passages between the interior of a pneumatic tire and the interior of said wheel, and means for securing the cover of said tire between said disks and annular ring, substantially as described.

In testimony whereof I affix my signature in presence of two witnesses.

EDWARD MARTIN.

Witnesses:
A. E. VIDAL,
L. SIMMONDS.